(12) United States Patent
Lindoff

(10) Patent No.: US 6,853,681 B1
(45) Date of Patent: Feb. 8, 2005

(54) USING DIFFERENT CHANNEL MODELS FOR DIFFERENT TRAINING SEQUENCES

(75) Inventor: Bengt Lindoff, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 814 days.

(21) Appl. No.: 09/722,749

(22) Filed: Nov. 28, 2000

(51) Int. Cl.[7] .................................. H03H 7/30
(52) U.S. Cl. ....................................... 375/231
(58) Field of Search ........................... 375/229, 231, 375/295, 324, 358, 364, 365, 368

(56) References Cited

U.S. PATENT DOCUMENTS 5,577,024 A * 11/1996 Malkamaki et al. ........ 370/335

FOREIGN PATENT DOCUMENTS

| EP | 0615352 A1 | 9/1994 |
| EP | 0806852 A2 | 11/1997 |
| EP | 1073302 A1 | 9/2001 |
| GB | 2329796 A | 3/1999 |
| GB | 2260068 A | 1/2001 |

OTHER PUBLICATIONS

*RF and Microwave Circuit Design for Wireless Communications* by E. Larson (Artech House Inc., Norwood, MA, USA, 1996).

* cited by examiner

*Primary Examiner*—Chieh M. Fan
*Assistant Examiner*—Kevin Kim
(74) *Attorney, Agent, or Firm*—Potomac Patent Group PLLC

(57) ABSTRACT

In a digital telecommunication receiver, one or more of a synchronization technique, a channel model, a channel estimation technique, and/or an equalization technique are selected in order to optimize the training sequence being used and eliminate distortions introduced by the receiver architecture. A combination of synchronization technique (e.g., standard correlation technique; center of gravity synchronization technique), channel model (e.g., standard channel model; channel model including a DC component) and number of channel taps L is selected to optimize the estimation characteristics for the training sequence being used in the telecommunication system.

22 Claims, 4 Drawing Sheets

USING DIFFERENT CHANNEL MODELS FOR DIFFERENT TRAINING SEQUENCES

RELATED APPLICATION

This application is related to U.S. application Ser. No. 09/347,230 entitled "Equalization with DC Offset Compensation" filed on Jul. 2, 1999 now U.S. Pat No. 6,449,320, and U.S. patent application Ser. No. 09/168,605 entitled "Estimated Channel with Variable Number of Taps" filed on Oct. 9, 1998 now U.S. Pat. No. 6,373,888, the disclosures of which are expressly incorporated herein by reference, in their entirety.

FIELD OF INVENTION

This invention relates to digital wireless communications, and more particularly, to synchronization, channel modeling, estimation and equalization in a wireless receiver.

BACKGROUND OF INVENTION

Digital encoding and transmission techniques are widely used in today's telecommunications systems for transmitting information. For example, the Global System for Mobile communication (GSM) is a digital system presently in widespread use, and the Enhanced Data rates for GSM Evolution (EDGE) is a digital system which is gaining popularity. In such telecommunications systems, the information to be sent is encoded or modulated onto a radio frequency signal for transmission to a receiver. Problems often arise in decoding or demodulating the signals at the receiver end due to channel distortion of the signal during transmission. That is, the transmitted signal is subject to distortion in the air interface, or radio channel, between the transmitter's antenna and the receiver's antenna.

Examples of such signal distortions include multipath propagation, fading, or other electromagnetic disturbances. Multipath propagation occurs when one portion of a transmitted signal takes a direct route between the transmitting antenna and the receiving antenna, while other parallel portions of the signal take indirect routes. The multiple signal paths are often caused by the signal being reflected off of a building or other object nearby or in between the transmitter or receiver. Since it takes longer for a signal to traverse an indirect path than the direct path, the parallel portions of the signal traveling along the multiple paths arrive at different times, thus interfering with each other. The distortion due to multipath propagation is often referred to as Inter-Symbol Interference (ISI).

Conventional receivers generally process a received signal using a training sequence to compensate for the assumed distortions of the channel. A training sequence is a predefined digital string which is typically sent along with data transmissions at regular time intervals. For instance, training sequences are transmitted as part of the burst transmissions in the aforementioned GSM and EDGE systems. A connection in a GSM system typically uses any of eight different predefined training sequences.

The training sequence is used to determine the timing position in order to synchronize the received signal and correct for time delays. Upon determining the timing position, the training sequence is used to estimate parameters, such as filter tap coefficients, for use in the receiver's channel model (i.e., a mathematical representation of the channel). This channel estimate is used to compensate for delay and attenuation characteristics, or other channel distortions which may cause ISI.

FIG. 1 is a block diagram of a portion of a conventional receiver assembly 100 which includes conventional synchronizer, channel estimator and equalizer units. The conventional receiver assembly 100 may be adapted for use in a digital telecommunication system such as a GSM system or an EDGE system. A radio signal received at antenna 110 is down converted and low pass filtered in radio receiver unit 112 which, in turn, produces baseband signal $(y_r)$. The receiver unit 112 may, for example, be a conventional homodyne receiver as discussed in *RF and Microwave Circuit Design for wireless Communications* by E. Larson (Artech House Inc., Norwood, Mass., USA, 1996).

In order to synchronize the data transmissions of a received signal, the training sequence which will be used in the data transmissions must be determined prior to beginning the data transmissions. For example, the training sequence may be specified by a base station in communication with a mobile station, or may be determined through a negotiation process between the base station and the mobile station. That is, the training sequence may be provided to the receiver assembly 100 through control channel signaling or by some other way of communicating it between the base station and mobile station upon establishing a connection.

Under ideal conditions a received training sequence should closely match the known training sequence TS. In practice however, various distortions introduced by the air interface affect the transmitted signal. To detect a received training sequence, the portion of the received baseband signal burst containing the training sequence is retrieved from a memory of the system (not shown) and supplied to synchronization unit 114. The synchronization unit 114 correlates different portions of the received signal with the known training sequence (TS) in order to find the synchronization position (i.e., the start position of the training sequence within the received signal).

The synchronization information and the received signal are provided to channel estimator unit 116. The channel estimator unit 116 assumes a predetermined channel model, and computes the K:th order channel filter model coefficients $\{h_i\}_{i=0,K}$ on the basis of the received signal and the known training sequence TS. The number of channel taps, K, is typically specified from the maximum expected delay spread for the radio signal of the telecommunication system in use. The channel filter model coefficients, synchronization information and the received signal are then fed to an equalizer unit 118, which may, for example, be a Viterbi equalizer. The output of the equalizer unit 118 is the decided symbol $(\hat{u}_r)$. The output information from the equalizer unit 118, that is, the decided symbol $(\hat{u}_r)$, may then be used in further processing the received signal.

SUMMARY OF THE INVENTION

A problem recognized by the present inventor is that the use of some receiver architectures in conjunction with different training sequences results in the introduction of signal distortions. A conventional receiver with a predetermined synchronization technique, channel model and decoder may otherwise provide good estimation performance under idealized conditions, but introduces different distortions depending on which training sequence is being used in the transmission. For instance, a homodyne receiver is a conventional type of receiver known to have a very efficient receiver architecture from the perspective of cost, size and current consumption. In the operation of a homodyne receiver, a DC offset is introduced into the received signal. The homodyne receiver must then take care of the DC offset in order to process the received signal. Typically, the DC offset is taken care of by extending the channel filter model with a DC tap. This, however, tends to eliminate the optimized estimation characteristics of the training sequences, thus producing different receiver performances when different training sequences are used. For a given receiver architecture, some training sequences result in performance which may be close to the idealized case while other training sequences may result in a performance loss which is quite large due to internally generated distortions. Hence, the use of different training sequences within a communications system or by different communications systems often results in the introduction of various internal distortions due to, for example, the receiver architecture.

The attempts in conventional systems to compensate for such performance losses typically entail the use of an intricate channel model or estimation technique. However, the use of an intricate channel model or estimation technique disadvantageously tends to increase the circuit complexity and current consumption of the receiver. Therefore, the present inventor recognized a need for an adaption algorithm that selects one or more of the following on the basis of the training sequence being used: a synchronization technique, channel model, and/or equalization technique. In this way, the tradeoff between necessary receiver performance and receiver complexity can be tailored or optimized.

Exemplary embodiments of the present invention pertain to an apparatus and method for detecting a data transmission received via an air channel which contains a known training sequence. The receiver typically comprises a synchronization unit, a channel estimator unit, an equalizer unit and a control unit. The control unit selects a detection parameter set from a detection parameter table on the basis of the known training sequence. The control unit configures the receiver to receive the data transmission using the selected detection parameter set which contains one or more of a synchronization technique for the synchronization unit, a channel model for the channel estimation unit, a channel estimation technique, and an equalization technique for the equalizer unit.

In accordance with one embodiment, the detection parameter set comprises a synchronization technique, such as a maximum window value synchronization technique or a center of gravity synchronization technique.

In accordance with another embodiment, the detection parameter set comprises a channel model, such as a standard channel model or a channel model including a DC component.

In accordance with another embodiment, the detection parameter set comprises an equalization technique, such as DFE equalization, Viterbi rd equalization, or DFSE equalization.

In accordance with another embodiment, the detection parameter set comprises a channel estimation technique.

It should be emphasized that the terms "comprises" and "comprising," when used in this specification, are taken to specify the presence of stated features, integers, steps or components; but the use of these terms does not preclude the presence or addition of one or more other features, integers, steps, components or groups thereof.

The present invention may be used in any telecommunication system, including, for example, a burst transmission system such as a GSM system, an EDGE system, or other like type of telecommunication system. Although the present invention is particularly suitable for mobile stations or base stations in wireless digital telecommunication systems, its application is not limited thereto. Furthermore, this disclosure describes the invention in terms of a data transmission. The "data transmission" may be a voice telephone call, data messages, or any like type of encoded information to be transmitted. A data transmission may consist of one or more exchanges of data between a transmitter and receiver. A data transmission may have the same training sequence used throughout its duration. Alternatively, the training sequence may be changed during the course of a data transmission, such as when a mobile user roams into the coverage area of another communication system. In such a case, a preferred embodiment of the invention changes the detection parameter set accordingly.

BRIEF DESCRIPTION OF THE DRAWINGS

The objects, features and advantages of the present invention will become more readily apparent to those skilled in the art upon reading the following detailed description, in conjunction with the appended drawings, in which.

DETAILED DESCRIPTION

These and other aspects of the invention will now be described in greater detail in connection with a number of exemplary embodiments. To facilitate an understanding of the invention, some aspects of the invention may be described in terms of sequences of actions to be performed by elements of a computer system, a controller, or a processor. It will be recognized that in each of the embodiments, the various actions could be performed by specialized circuits (e.g., discrete logic gates interconnected to perform a specialized function), by program instructions being executed by one or more processors, or by a combination of both.

Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action, or alternatively as "logic that" performs a described action.

Figure 1:
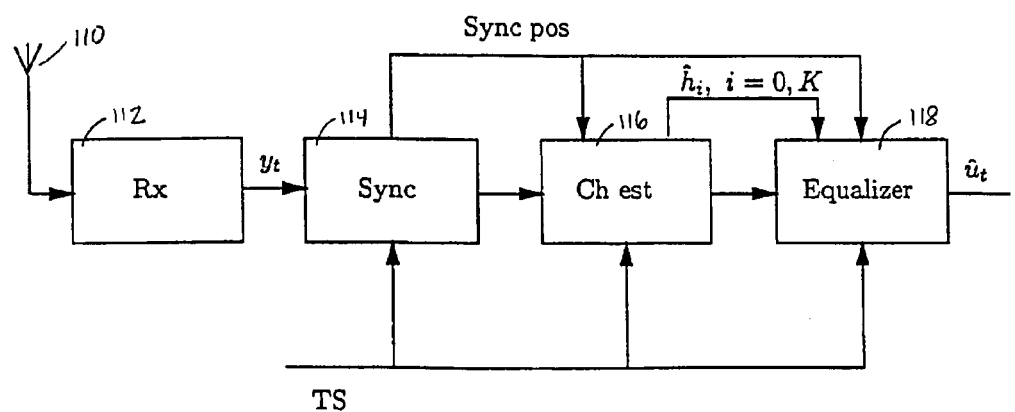
FIG. 1 is a block diagram of a portion of a conventional receiver assembly 100 which includes conventional channel estimator and equalizer units.
Figure 2:
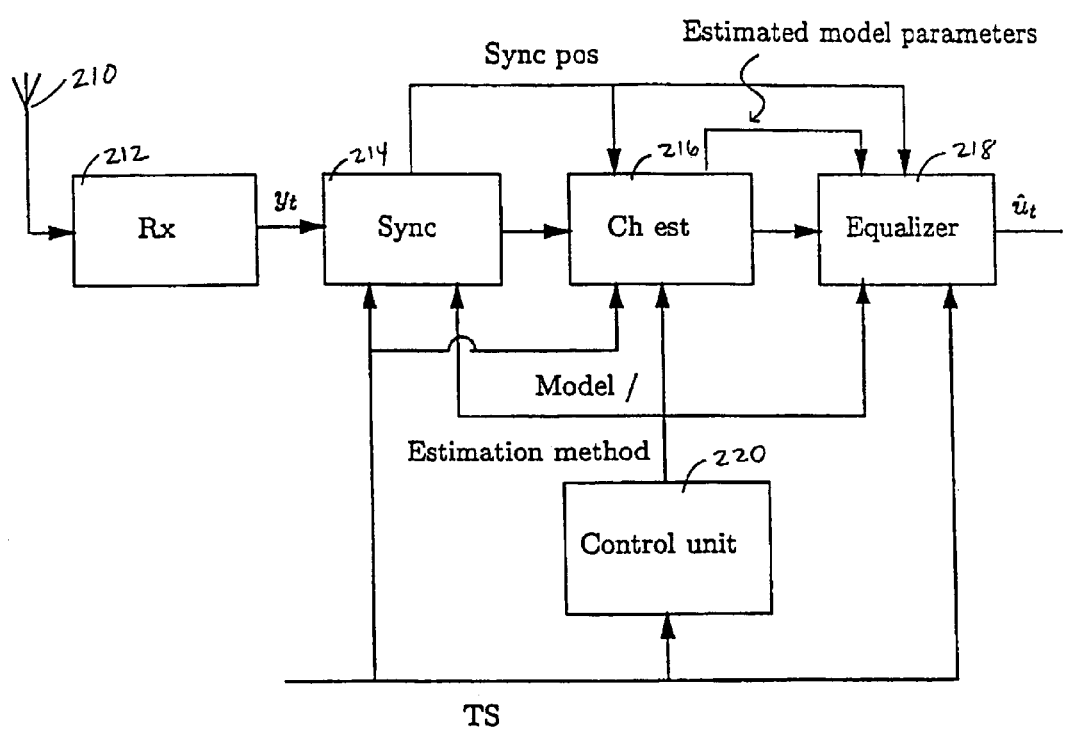
FIG. 2 is a block diagram of a portion of a receiver assembly 200 in accordance with the present invention.

FIG. 2 is a block diagram of a portion of a receiver assembly 200 in accordance with the present invention which performs synchronization, channel modeling, and equalization on the basis of a detection parameter set selected for use with the particular training sequence being used in the telecommunication system. The term "detection parameter set" as used herein encompasses one or more of the parameters, coefficients, models, schemes or techniques which are used in the receiver assembly 200 to perform synchronization, channel modeling and equalization in the detection of a signal. The detection parameter set may be used to configure the receiver assembly 200 in the form of control signals or inputs being provided to hardware of the receiver assembly 200, or in the form of variables being passed to software of the receiver assembly 200, or some combination of both.

The receiver assembly 200 includes an antenna unit 210, or other type of input unit for receiving signals, connected to a receiver unit 212. The receiver unit 212 is connected to synchronization unit 214 which supplies an output to a channel estimator unit 216. The synchronization unit 214 and the channel estimator unit 216 each supply an output to an equalizer unit 218. A control unit 220 is connected to the synchronization unit 214, to the channel estimator unit 216, and to the equalizer unit 218, as shown in FIG. 2, with each of these units being disposed to receive a known training sequence TS.

During the data transmission or the call being made, the receiver assembly 200 operates such that a signal received at antenna 210 is down converted and low pass filtered in the radio receiver unit 212. The radio receiver unit 212 in turn outputs a baseband signal ($y_r$) to the synchronization unit 214. A portion of the received signal that includes the received training sequence is provided to the synchronization unit 214 by a memory of the receiver assembly 200 (not shown). The memory may be a part of the radio receiver unit 212, or may otherwise be disposed within the receiver assembly 200. The synchronization unit 214 uses the received training sequence to determine the synchronization, or window position, of the received signal by correlating different portions of the received signal with the known training sequence (TS).

Once the synchronization is complete and the start position of the training sequence within the received signal has been determined, the synchronization information and the received signal are provided to the channel estimator unit 216. Using a channel model, the channel estimator unit 216 computes the channel filter model coefficients based upon the received signal and the known training sequence TS. The estimated channel model, synchronization information and received signal are provided to the equalizer unit 218. The output of the equalizer unit 218, the decided symbol ($\hat{u}_t$), may be used in further processing the, received signal.

In accordance with an aspect of the invention, one or more of the synchronization unit 214, the channel estimator unit 216, and the equalizer unit 218 are dynamically controllable to configure the receiver assembly 200. Before the data transmission begins, an initialization or setup phase takes place during which the receiver assembly 200 is preferably configured in accordance with a detection parameter set.

The selection of a detection parameter set depends upon the training sequence. The training sequence to be used in a data transmission is either known, or is determined, in advance of the transmission. The training sequence may be provided to the receiver assembly 200 through a negotiation process or other control channel signaling during the initialization or setup phase upon establishing a communications link between the transmitter and the receiver for a data transmission.

In a preferred embodiment, a group of detection parameter sets, referred to herein as a "table," is stored within the receiver assembly 200. The table of detection parameter sets may either be stored in the control unit 220 or in a memory which may be accessed by the control unit 220. For each training sequence which may be used in the communication system, there is one entry in the table that represents a detection parameter set. The selection of a detection parameter set is made on the basis of which training sequence is being used in the transmission. In this way, it is possible to select a detection parameter set containing information for configuring the receiver assembly 200 which is optimized, or tailored, for a particular training sequence.

Each detection parameter set may include one or more of the following: the synchronization technique being employed in the synchronization unit 214, the channel model used by the channel estimation unit 216, the channel estimation technique, and the equalization technique used by the equalizer unit 218. Examples of some different possible types of synchronization techniques, channel models, and equalization techniques which may be in a particular detection parameter set are discussed below, for instance, in conjunction with equations (1) through (5).

The control unit 220 accesses the table of detection parameter sets and selects a detection parameter set associated with the training sequence being used in the data transmission. The control unit 220 then implements the selected detection parameter set in the receiver assembly 200 by providing information to the various units for use in processing the received signal or by generating suitable control signals to carry out the selected process(es). In accordance with preferred embodiments, this information is provided to the respective units during an initialization or setup phase, which is typically prior to data reception of the data message.

In some embodiments, the control unit 220 configures the synchronization unit 214 to use one of a number of possible synchronization techniques. A synchronization technique which is included in a detection parameter set may be chosen from among various techniques including, but not limited to: a standard correlation technique, a center of gravity synchronization technique, or other like type of synchronization technique or mathematical relationship. Exemplary synchronization techniques will now be discussed.

Equation (1) describes one exemplary standard correlation relationship which may be used in conjunction with other steps to effect a synchronization technique:

$$c(k) = \sum_{i=1}^{N} y_{i+k} u_i^{TS}, k = 0, \ldots, w-1 \tag{1}$$

where $y_i$, is the received signal at time i, $u_i^{TS}$ are the training sequence symbols with the total number of training symbols being N, and w is the number of synchronization search windows.

Equation (2) describes an exemplary maximum window value synchronization technique which may be a choice for a synchronization technique as follows:

$$\text{synch.pos} = \max_{k} \sum_{i=0}^{L} |c_{k+i}|^2 \tag{2}$$

The relationship of equation (2) determines the synchronization position based on which group of L continuous windows position provided the highest correlation, where the variable L is the length of the channel filter model.

A center of gravity synchronization technique may be another choice for a synchronization technique. An exemplary embodiment of a center of gravity synchronization technique is described as follows in equation (3):

$$\text{synch.pos} = \text{ceil}\left\{\frac{\sum_{i=0}^{w-1} i|c_i|^2}{\sum_{i=0}^{w-1} |c_i|^2} - L/2\right\} \quad (3)$$

where the function "ceil{ ... }" rounds to the nearest higher integer.

The potential synchronization techniques can be further expanded by trying different values of L in either or both of the above-described techniques. That is, the synchronization position based upon a chosen technique may be determined for all interesting channel model orders L. The channel tap variable L may be determined in accordance with the disclosure of U.S. patent application Ser. No. 09/168,605 to the present inventor entitled "Estimated Channel with Variable Number of Taps" which is expressly incorporated herein by reference.

The channel model may also be included as part, or all, of a detection parameter set. A channel model which is included in a detection parameter set may be any one of: a standard channel model, a channel model including a DC component, or other like channel model intended to address specific types of distortion or particular situations. Examples of such channel models will now be presented.

Equation (4) describes a standard channel model which may be one choice for a channel model in the receiver assembly 200 in accordance with the present invention:

$$y_t = \sum_{i=0}^{L} h_i u_{t-i} + e_i \quad (4)$$

where $h_i$ are the channel filter taps, $u_i$ are the transmitted symbols, $e_t$ represents noise, and L is the length of the channel model.

A channel model including a DC component may be another choice for a channel model in accordance with the present invention. An exemplary embodiment of a channel model including a DC component is described in equation (5):

$$y_t = \sum_{i=0}^{L} h_i u_{t-i} + m + e_t \quad (5)$$

where m is the unknown DC component.

Another choice for a channel model may be achieved by differentiating a signal using a relationship such as: $\tilde{y}_t = y_t - y_{t-1}$, and then estimating the parameters of the model based upon the differentiated signal according to equation (4), (5), or other like channel model relationship.

The channel models may be developed according to the relationships described above, or by using like channel models, for different model orders L. In this way, the channel model, and the model order L, may be selected that best fits the received sequence. The best fit decision may be achieved through use of a model validation technique as provided in U.S. patent application Ser. No. 09/168,605 to the present inventor.

The detection parameter set may comprise, or may consist of, a channel estimation technique which is used by the channel estimation unit 216 to determine tap coefficients and the like so that a given channel model will best estimate the channel. Some examples of channel estimation techniques include, but are not limited to: a least squares estimation technique, a maximum likelihood estimation technique, or another like type of estimation technique for computing the channel filter model coefficients.

The equalization technique used by the equalizer unit 218 may also constitute all or part of a detection parameter set. Examples of equalization techniques that may be chosen include, but are not limited to: a decision feedback estimation (DFE) equalizer, a Viterbi equalizer, a decision feedback sequence estimation (DFSE) equalizer which is a combination of a Viterbi and a DFE equalizer, or other like type of equalizer.

Figure 3:
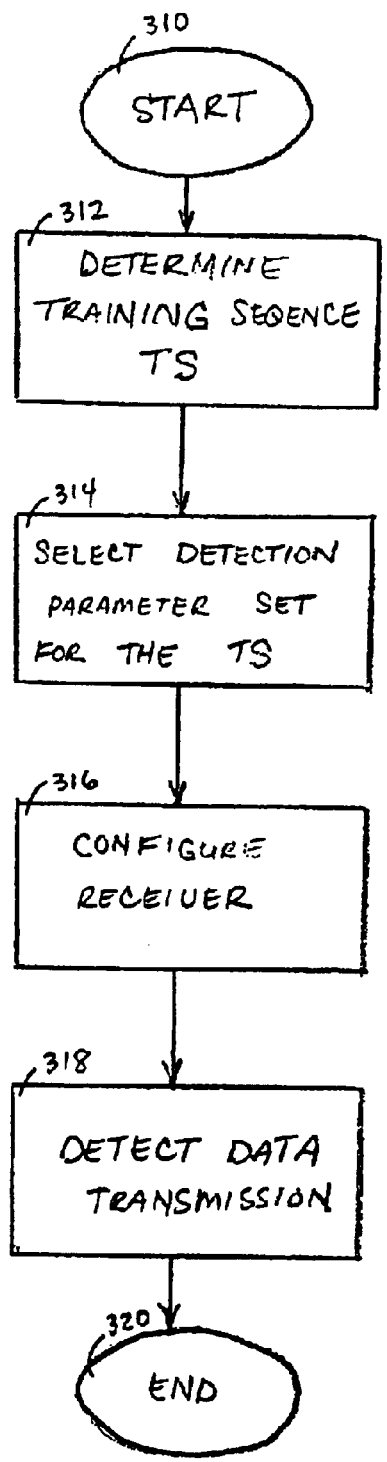
FIG. 3 is a flow chart in accordance with the present invention.

FIG. 3 is a flow chart of an exemplary method for detecting a received signal, in accordance with the present invention. To receive a data transmission, the method begins in 310 and proceeds to step 312 in which the training sequence being used for the data transmission (e.g., one of the eight different GSM training sequences) is determined by the control unit 220. The training sequence for the data transmission may be specified by control signaling, or negotiation, between the transmitter and the receiver during an initialization or setup phase. Upon determining the training sequence, the method then proceeds to step 314. In step 314, the control unit 220 selects a detection parameter set, based upon the training sequence being used, for configuring the receiver assembly 200. The detection parameter set may be selected from a table of detection parameter sets. The table may consist of one or more detection parameter sets, with a particular detection parameter set being mapped to each training sequence which may be used by the receiver to detect a received data transmission. Each detection parameter set contains one or more of the following: a synchronization technique, a channel model, a channel estimation technique or an equalization technique.

After step 314 has been performed and the control unit 220 has selected a detection parameter set, the method proceeds to step 316 for implementation of the selected detection parameter set in the receiver assembly 200. In this step the control unit 220 provides information about the detection parameter set to the appropriate units of the receiver assembly 200 so as to configure the receiver based upon the training sequence detected in step 312. After the receiver assembly 200 has been configured in this manner, the method proceeds to step ru 318 for detection of received data transmission signals which may be, for instance, a telephone call or other data sent to the receiver.

Figure 4:
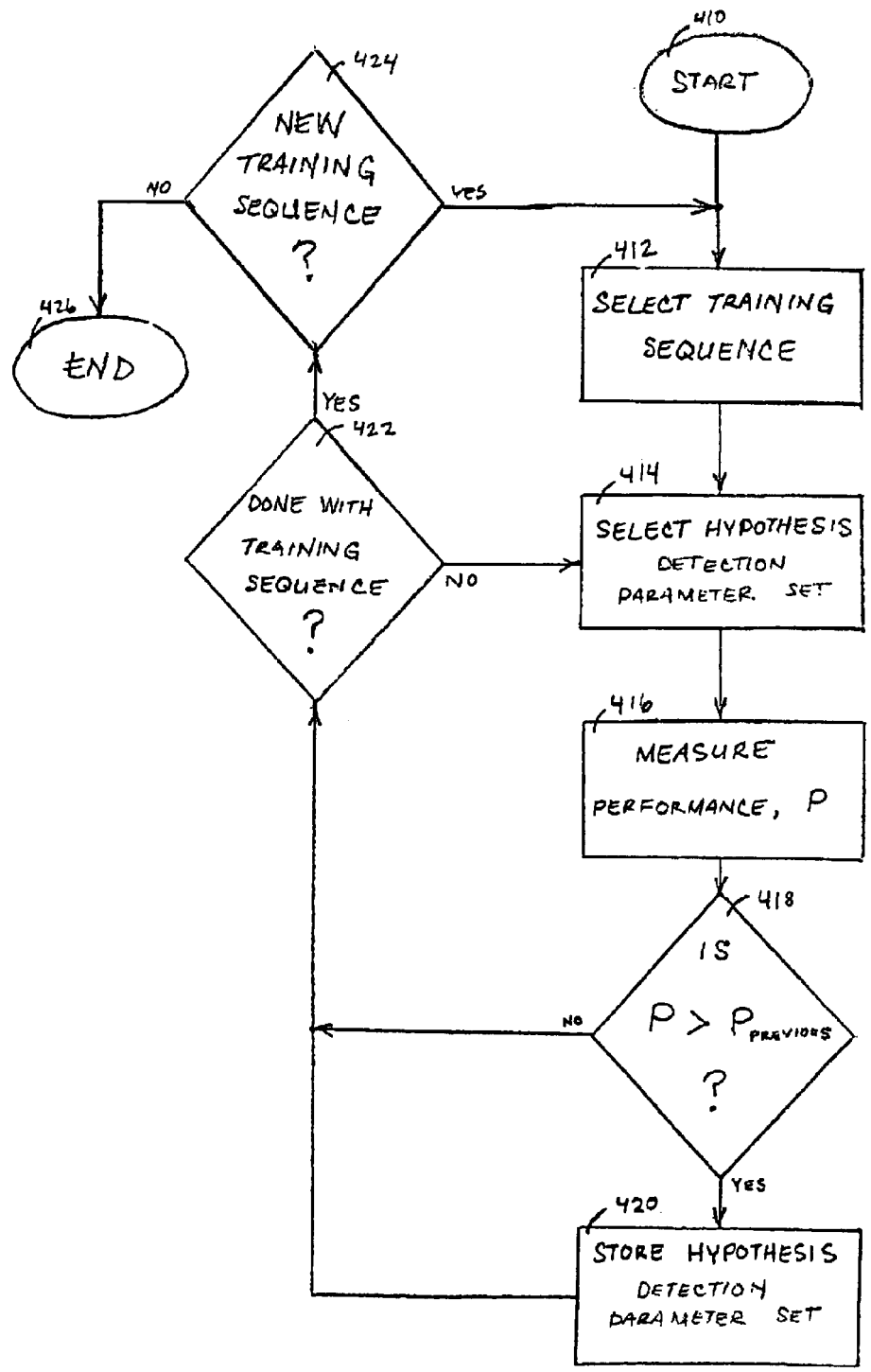
FIG. 4 is a flowchart of a method in accordance with the present invention for developing a table of detection parameter sets.

FIG. 4 is a flow chart illustrating an exemplary embodiment of a method in accordance with the present invention for developing a table of detection parameter sets. The detection parameter sets may be developed as part of the process of designing the receiver, or encoding the software to control a receiver. After beginning in step 410, the method proceeds to step 412 where a training sequence is selected for which the method will develop a detection parameter set. For example, the selected training sequence may be one of the eight training sequences commonly used in GSM systems, or may be a training sequence of another communication system for which the receiver assembly 200 is to be adapted. Upon selecting a training sequence, the method then proceeds to step 414.

In step 414 a hypothesis detection parameter set is selected. That is, a combination of one or more of a synchronization technique, a channel model, a channel estimation technique, and an equalization technique are selected as a hypothesis detection parameter set. The hypothesis set may be computer generated, may be manually created based upon empirical results or estimates, or may be the product of calculations or algorithms. A hypothesis set may be created by incrementally altering a previously tried hypothesis set to see whether the performance improves or deteriorates.

The hypothesis detection parameter set may include a synchronization technique selected from the following: a standard correlation technique, a center of gravity synchronization technique, or a like type mathematical relationship, having any of various values of L, the number of taps of the channel filter model.

The hypothesis detection parameter set may further include a channel model. The channel model may be a standard channel model, a channel model including a DC component, or other like channel model intended to address specific types of distortion or particular situations. The number of models may further be expanded by varying the number of filter taps, L. Still additional models may be generated by varying which taps are included in any given model.

The hypothesis detection parameter set may include a channel estimation technique. Channel estimation techniques which may be used with the present invention include, but are not limited to, the least squares estimation technique, the maximum likelihood estimation technique, or other like type of estimation technique.

The hypothesis detection parameter set may also include an equalization technique, which may be any of: DFE equalization, Viterbi equalization, DFSE equalization, or a like equalization technique. The output of the equalizer is the decided symbol, ($\hat{u}_i$).

Once a hypothesis detection parameter set has been selected in step 414, the method proceeds to step 416 for measurement or simulation of the performance, P, of the hypothesis set. The performance measurement may be based upon bit error rate, or any other criterion or combination of criteria of interest.

The method then proceeds to step 418 where a comparison is made to determine whether the performance P is greater than the performance $P_{PREVIOUS}$ which is the highest performance previously measured for the selected training sequence. If P is the highest performance of any measured so far, or otherwise meets the chosen criteria for selecting a hypothesis detection parameter set for the table, then the method proceeds in accordance with the "YES" path from step 418 to step 420 and the hypothesis detection parameter set achieving that performance level P is stored in a memory for the given training sequence, or is kept for future use in some other manner. Otherwise, the method proceeds along the "NO" path from step 418 to step 422 and the previously stored hypothesis detection parameter set, if any, remains in the memory.

The method proceeds to step 422 from either step 418 or step 420. In step 422 it is determined whether the evaluation of hypothesis detection parameter sets has been completed for a particular training sequence. That is, it is determined whether all permutations, or all hypothesis detection parameter sets of interest, for the various models and techniques have been evaluated for the given training sequence selected in step 412. Alternatively, step 422 may be performed by determining that the hypothesis set otherwise meets the chosen criteria for selecting a detection parameter set for the table to be associated with a given training sequence (e.g., hypothesis set performance is calculated to be optimal for that training sequence, or performance is deemed sufficient).

From the determination made in step 422, if the training sequence is not done and further evaluation of hypothesis detection parameter sets is in order for the present training sequence, then the method proceeds in accordance with the "NO" branch from step 422 to step 414 to select a new hypothesis set for performance measurement and evaluation. If the training sequence is done and further evaluation of hypothesis detection parameter sets is not in order, then the method proceeds in accordance with the "YES" branch from step 422 to step 424. In step 424 it is determined whether a new training sequence will be evaluated. For example, if the system being analyzed is a GSM system, then it will be determined whether all eight training sequences have been evaluated, that is, a detection parameter set has been assigned to each training sequence. If one or more training sequences remain, then the method loops back to step 412 via the "YES" path from step 424. If all training sequences of interest have been evaluated, then the method proceeds in accordance with the "NO" path from step 424 to step 426 where the method ends.

The invention has been described with reference to particular embodiments. However, it will be readily apparent to those skilled in the art that it is possible to embody the invention in specific forms other than those of the embodiment disclosed above. This may be done without departing from the spirit of the invention. The embodiment disclosed herein are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of detecting a data transmission comprising a known training sequence that has been received from a channel, comprising the steps of:

selecting a detection parameter set from a table comprising a plurality of detection parameter sets wherein the selection on is based upon the known training sequence of the data transmission;

configuring a receiver using the selected detection parameter set; and using the receiver configured with the selected detection parameter set to receive the data transmission;

wherein the detection parameter set comprises a synchronization technique.

2. The method according to claim 1, wherein the synchronization technique is a maximum window value synchronization technique.

3. The method according to claim 1, wherein the synchronization technique is a center of gravity synchronization technique.

4. A method of detecting a data transmission comprising a known training sequence that has been received from a channel, comprising the steps of:

selecting a detection parameter set from a table comprising a plurality of detection parameter sets, wherein the selection is based upon the known training sequence of the data transmission;

configuring a receiver using the selected detection parameter set; and using the receiver configured with the selected detection parameter set to receive the data transmission;

wherein the detection parameter set comprises a channel model.

5. The method according to claim 4, wherein the channel model is a Standard channel model.

6. The method according to claim 4, wherein the channel model is a channel model including a DC component.

7. A method of detecting a data transmission comprising a known training sequence that has been received from a channel, comprising the steps of:

selecting a detection parameter set from a table comprising a plurality of detection parameter sets, wherein the seen is based upon the known training sequence of the data transmission;

configuring a receiver using the selected detection parameter set; and using the receiver configured with the selected detection parameter set to receive the data transmission;

wherein the detection parameter set comprises an equalization technique.

8. The method according to claim 7, wherein the equalization technique is DFE equalization.

9. The method according to claim 7, wherein the equalization technique is Viterbi equalization.

10. The method according to claim 7, wherein the equalization technique is DFSE equalization.

11. A method of detecting a data transmission comprising a known training sequence that has been received from a channel, comprising the steps of:

selecting a detection parameter set from a table comprising a plurality of detection parameter sets, wherein the selection is based upon the known training sequence of the data transmission;

configuring a receiver using selected detection parameter set; and using the receiver configured with the selected detection parameter set to receive the data transmission;

wherein the detection parameter set comprises a channel estimation technique.

12. A receiver configured to receive from a channel a data transmission comprising a known training sequence, the receive comprising: a synchronization unit;

a channel estimator unit connected to the synchronization unit:

an equalizer unit connected to the channel estimator; and a control unit that configures the receiver in accordance with a detection parameter set, wherein the control unit selects the detection parameter set based upon the known training sequence being used in the data transmission;

wherein the detection parameter set comprises a synchronization technique, and the synchronization unit is configured in accordance with the synchronization technique.

13. The receiver according to claim 12, wherein the synchronization technique is a maximum window value synchronization technique.

14. The receiver according to claim 12, wherein the synchronization technique is a center of gravity synchronization technique.

15. A receiver configured to receive from a channel a data transmission comprising a known training sequence, the receiver comprising: a synchronization unit;

a channel estimator unit connected to the synchronization unit;

an equalizer unit connected to the channel estimator; and a control unit that configures the receiver in accordance with a detection parameter set, wherein the control unit selects the detection parameter set based upon the known training sequence being used in th data transmission;

wherein the detection parameter set comprises a channel model.

16. The receiver according to claim 15, wherein the channel model is a standard channel model.

17. The receiver according to claim 15, wherein the channel model is a channel model including a DC component.

18. A receiver configured to receive from a channel a data transmission comprising a known training sequence, the receiver comprising: a synchronization unit;

a channel estimator unit connected to the synchronization unit;

an equalizer unit connected to the channel estimator; and a control unit that configures the receiver in accordance with a detection parameter set, wherein the control unit selects the detection parameter set based upon the known training sequence being used in the data transmission;

wherein the detection parameter set comprises an equalization technique.

19. The receiver according to claim 18, wherein the equalization technique is DFE equalization.

20. The receiver according to claim 18, wherein the equalization technique is Viterbi equalization.

21. The receiver according to claim 18, wherein the equalization technique is DFSE equalization.

22. A receiver configured to receive from a channel a data transmission comprising a known training sequence, the receiver comprising: a synchronization unit;

a channel estimator unit connected to the synchronization unit;

an equalizer unit connected to the channel estimator; and a control unit that configures the receiver in accordance with a detection parameter set, wherein the control unit selects the detection parameter set based upon the known training sequence being used in the data transmission;

wherein the detection parameter set comprises a channel estimation technique.

* * * * *

UNITED STATES PATENT AND TRADEMARK OFFICE
CERTIFICATE OF CORRECTION

PATENT NO. : 6,853,681 B1 Page 1 of 1
APPLICATION NO. : 09/722749
DATED : February 8, 2005
INVENTOR(S) : Lindoff It is certified that error appears in the above-identified patent and that said Letters Patent is hereby corrected as shown below:

Column 2, Line 11: Change "*wireless*" to --*Wireless*--

Column 3, Line 53: Change "Viterbi rd equalization," to --Viterbi equalization,--

Column 7, Line 1: Change " synch.pos = celi $\left\{ \frac{\sum_{i=0}^{w-1} i|c_t|^2}{\sum_{i=o}^{w-1} |c_t|^2} - L/2 \right\}$ " to -- synch.pos = ceil $\left\{ \frac{\sum_{i=0}^{w-1} i|c_t|^2}{\sum_{i=o}^{w-1} |c_t|^2} - L/2 \right\}$ --

Column 7, Line 32: Change " $y_t = \sum_{i=0}^{L} h_i u_{t-1} + e_i$ " to -- $y_t = \sum_{i=0}^{L} h_i u_{t-i} + e_t$ --

Column 8, Line 44: Change "proceeds to step ru 318" to --proceeds to step 318--

Claim 1, Line 6: Change "selection on is" to --selection is--

Claim 7, Line 6: Change "seen is based" to --selection is based--

Claim 11, Line 8: Change "receiver using selected" to --receiver using the selected--

Claim 15, Line 10: Change "being used in th data" to --being used in the data--

Signed and Sealed this

Thirteenth Day of November, 2007

JON W. DUDAS
*Director of the United States Patent and Trademark Office*